United States Patent
Har'El et al.

(10) Patent No.: US 11,157,561 B2
(45) Date of Patent: Oct. 26, 2021

(54) HEAT-BASED LOAD BALANCING

(71) Applicant: Scylla DB Ltd., Herzliya (IL)

(72) Inventors: Nadav Har'El, Manof (IL); Gleb Natapov, Herzliya (IL); Avi Kivity, Herzliya (IL)

(73) Assignee: SCYLLA DB LTD., Herzliya (IL)

( * ) Notice: Subject to any disclaimer, the term of this patent is extended or adjusted under 35 U.S.C. 154(b) by 177 days.

(21) Appl. No.: 16/214,165

(22) Filed: Dec. 10, 2018

(65) Prior Publication Data

US 2019/0179854 A1 Jun. 13, 2019

Related U.S. Application Data

(60) Provisional application No. 62/596,844, filed on Dec. 10, 2017.

(51) Int. Cl.
*G06F 16/00* (2019.01)
*G06F 16/903* (2019.01)
*G06F 12/0802* (2016.01)

(52) U.S. Cl.
CPC ........ *G06F 16/903* (2019.01); *G06F 12/0802* (2013.01); *G06F 2212/684* (2013.01)

(58) Field of Classification Search
CPC .......... G06F 16/903; G06F 2212/1021; G06F 2212/263; G06F 12/0802; G06F 12/0868; G06F 2212/684
USPC ............... 707/600–899; 711/1–211
See application file for complete search history.

(56) References Cited

U.S. PATENT DOCUMENTS

| | | | | |
|---|---|---|---|---|
| 7,581,064 B1* | 8/2009 | Zedlewski | ............ | G06F 12/084 711/118 |
| 9,251,003 B1* | 2/2016 | Gupta | ................. | G06F 11/1469 |
| 9,477,407 B1* | 10/2016 | Marshak | ................. | G06F 3/067 |
| 2002/0087798 A1* | 7/2002 | Perincherry | ...... | G06F 16/24552 711/133 |
| 2013/0167146 A1* | 6/2013 | Dong | .................... | G06F 9/5033 718/1 |
| 2015/0106578 A1* | 4/2015 | Warfield | ............... | G06F 3/0631 711/158 |
| 2017/0366604 A1* | 12/2017 | McDuff | ................ | H04L 41/147 |
| 2018/0157729 A1* | 6/2018 | Lee | .......................... | G06F 9/505 |

OTHER PUBLICATIONS

Scylla, "Scylla is Next Generation NoSQL",pp. 1-17, Nov. 24, 2017 (downloaded from http://web.archive.org/web/20171124084302/http://www.scylladb.com/).

(Continued)

*Primary Examiner* — Michelle N Owyang
(74) *Attorney, Agent, or Firm* — Kligler & Associates Patent Attorneys Ltd

(57) ABSTRACT

Methods, apparatus and computer software products implement embodiments of the present invention that include receiving requests from clients to access a corpus of data that is replicated on a group of servers, and distributing the requests among the servers for execution in accordance with an allocation function, which indicates a respective fraction of the requests that is to be assigned to each of the servers for execution. Respective cache miss rates incurred by the servers in responding to the requests that are distributed to each of the servers are measured, and the allocation function is adjusted responsively to the cache miss rates.

17 Claims, 4 Drawing Sheets

(56) References Cited

OTHER PUBLICATIONS

Natapov et al., "Heat Weighted Load Balancing coming in Scylla 2.0", pp. 1-10, Sep. 21, 2017 (downloaded from https://www.scylladb.com/2017/09/21/scylla-heat-weighted-load-balancing/).
ScyllaDB, Apache Software Foundation—"What is Cassandra?", Herzliya, Israel, pp. 1-3, 2016 (https://cassandra.apache.org/).
Scylla, "ScyllaDB—the Real-Time Big Data Database", Datasheet, pp. 1-3, year 2018.

* cited by examiner

HEAT-BASED LOAD BALANCING

CROSS-REFERENCE TO RELATED APPLICATIONS

This application claims the benefit of U.S. Provisional Patent Application 62/596,844, filed Dec. 10, 2017, which is incorporated herein by reference.

FIELD OF THE INVENTION

The present invention relates generally to database management systems, and particularly to distributing read requests to nodes storing a multi-node database.

BACKGROUND OF THE INVENTION

Multi-node databases store respective copies of each item of data on different servers, known as nodes. The number of copies is determined by a replication factor. In operation, any client computer can submit a request to perform read and write operations to any of the nodes known to store the database.

Multi-node databases such as CASSANDRA™ produced by The Apache Software Foundation, 401 Edgewater Place, Suite 600, Wakefield, Mass. 01880, USA) and SCYLLA™ (produced by ScyllaDB, Herzliya, Israel) perform read requests based on a consistency level that specifies how many nodes are to handle each read request. If a read request for a multi-node database has a consistency level of one, then processing the read request comprises retrieving data from a single node of the database. Likewise, if a read request for a multi-node database has a consistency level of a specific number that is greater than one, then processing the read request comprises retrieves data from the specific number of nodes of the database.

For example, if a given multi-node database has a replication factor of three, then there are three independent copies of the database stored on different nodes, and read requests having a consistency level of two results in read operations on any two of the nodes. If the data retrieved from the a first given node is different than the data retrieved from a second given node, the more current data is conveyed to a client to complete the processing of the read request, and the older data can be updated with the more current data.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method including receiving requests from clients to access a corpus of data that is replicated on a group of servers, distributing the requests among the servers for execution in accordance with an allocation function, which indicates a respective fraction of the requests that is to be assigned to each of the servers for execution, measuring respective cache miss rates incurred by the servers in responding to the requests that are distributed to each of the servers, and adjusting the allocation function responsively to the cache miss rates.

In some embodiments, measuring the respective cache miss rates includes measuring respective first and second cache miss rates of first and second servers in the group and detecting that the first cache miss rate is higher than the second cache miss rate, and wherein adjusting the allocation function includes, responsively to detecting that the first cache miss rate is higher than the second cache miss rate, decreasing a first fraction of the requests that is assigned to the first server while increasing a second fraction of the requests that is assigned to the second server. In additional embodiments, adjusting the allocation function includes assigning each of the fractions a value inversely proportional to its respective cache miss rate.

In further embodiments, the corpus of data includes a multi-node database, and wherein the servers include nodes of the multi-node database. In one embodiment, the steps of receiving the requests, distributing the requests, measuring the respective miss rates, and adjusting the allocation function are performed by each of the nodes. In one embodiment, the multi-node database has a specific number of replications, wherein each of the nodes receives respective disjoint subsets of the requests, and wherein distributing the requests to the nodes includes processing locally, by the given node a number of its received subset of requests in accordance with its respective fraction in the allocation function and the number of replications, and forwarding its other received requests to the other nodes, thereby minimizing, on the network, data traffic for processing the received requests. In another embodiment, the nodes include respective storage devices, and wherein processing, by a given node, a given request locally includes retrieving data from its respective storage device.

In supplemental embodiments, adjusting the allocation function equalizes the cache miss rates when processing additional requests to access the corpus of data.

There is also provided, in accordance with an embodiment of the present invention, a computer including a memory configured to store an allocation function, and a processor configured to receive requests from clients to access a corpus of data that is replicated on a group of servers, to distribute the requests among the servers for execution in accordance with the allocation function, which indicates a respective fraction of the requests that is to be assigned to each of the servers for execution, to measure respective cache miss rates incurred by the servers in responding to the requests that are distributed to each of the servers, and to adjust the allocation function responsively to the cache miss rates.

There is additionally provided, in accordance with an embodiment of the present invention, a computer software product, the product including a non-transitory computer-readable medium, in which program instructions are stored, which instructions, when read by a computer, cause the computer to receive requests from clients to access a corpus of data that is replicated on a group of servers, to distribute the requests among the servers for execution in accordance with an allocation function, which indicates a respective fraction of the requests that is to be assigned to each of the servers for execution, to measure respective cache miss rates incurred by the servers in responding to the requests that are distributed to each of the servers, and to adjust the allocation function responsively to the cache miss rates.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
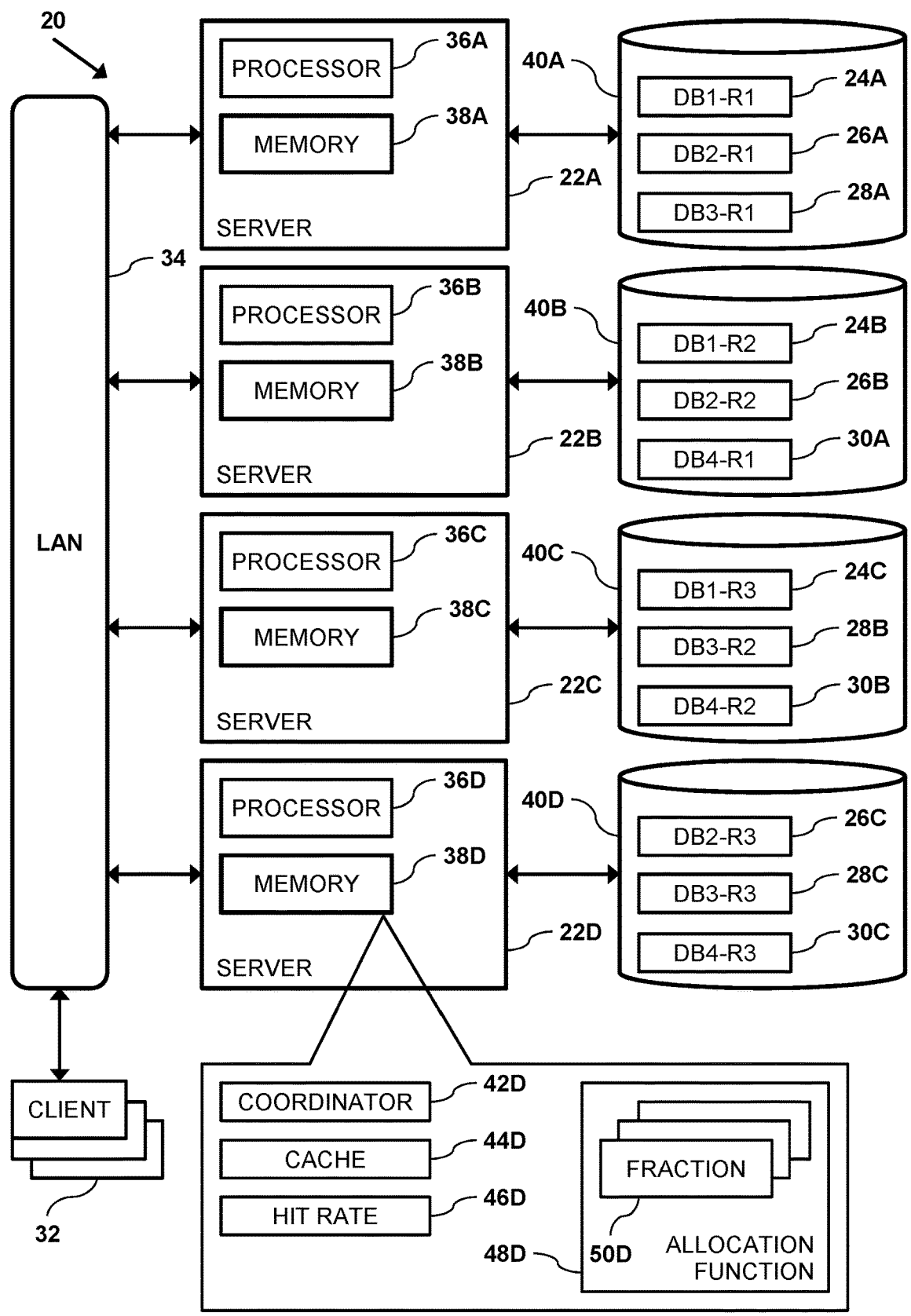
FIG. 1 is a block diagram that schematically shows a computing facility comprising multiple servers configured as nodes that store respective replicas of multi-node databases, in accordance with an embodiment of the present invention.

Servers typically include caches that speed up the processing of read requests by reducing physical disk reads. When a server is restarted, its cache is empty, and as the server processes read requests, data is added to (or replaced in) the cache. An empty (or relatively empty) cache is sometimes referred to as a "cold cache", and the cache "warms up" as data is added to the cache.

When using a set of servers to store data in a multi-node database, there may be instances when a given server is restarted. Upon restarting, the given server has a cold (in this case empty) cache. Multi-node databases typically allocate read requests randomly (and therefore evenly) to the nodes. Therefore, a node with a cold cache can have a negative performance impact on the multi-node database while the cache is "warming up". For example, in a multi-node database stored on three nodes, a cold cache will initially result in at least one third of read requests to be read from disk.

Embodiments of the present invention provide methods and systems for using heat-based load balancing to minimize the performance impact that a cold cache in a given node has on processing database read requests. In heat-based load balancing, a low percentage of read requests are initially conveyed to the given node, and the percentage can be gradually increased as the cache warms up. In heat-based load balancing, requests are sent to each node at different rates in order to attempt to equalize the load level on the different nodes while processing read requests (considering that a node with a cold cache needs to do more work to serve each request).

As described hereinbelow, requests from clients are received to access a corpus of data that is replicated on a group of servers (i.e., nodes), and the requests are distributed among the servers for execution in accordance with an allocation function, which indicates a respective fraction of the requests that is to be assigned to each of the servers for execution. Respective cache miss rates incurred by the servers are measured in responding to the requests that are distributed to each of the servers, and the allocation function is adjusted responsively to the cache miss rates.

In some embodiments, the allocation function can be used to distribute multi-node database read requests having a consistency level of one and to distribute multi-node database read requests having a consistency level greater than one. By adjusting the allocation function, systems that adjust the allocation function using embodiments of the present invention can equalize the cache miss rates when processing additional requests to access the corpus of data. Therefore, regardless of the consistency level of a given read request, systems implementing embodiments of the present invention enable gradual warming of a cold cache, thereby minimizing the performance impact of rebooting any given node.

In operation, client computers typically randomly distribute read requests among the nodes of a given multi-node database. Therefore, each of the nodes receives a disjoint subset of the requests. Embodiments described herein also provide methods and systems for a given node to redistribute read requests to the other nodes of the given database so that the read requests are processed in accordance with the allocation function. In some embodiments, each given node can process as many requests as possible locally, while also achieving the desired allocation function dictated by the fractions in the allocation function, thereby minimizing network traffic.

System Description

FIG. 1 is a block diagram that schematically shows a computing facility 20 comprising a plurality of servers 22 that store and manage one or more corpora of data, for example, multi-node databases 24, 26, 28 and 30, in accordance with an embodiment of the present invention. In FIG. 1, servers 22 (and their respective hardware and software components) and multi-node databases 24, 26, 28 and 30 can be differentiated by appending a letter to the identifying numeral, so that the servers comprise servers 22A-22D, and the multi-node databases comprise multi-node databases 24A-24C, 26A-26C, 28A-28C and 30A-30C. When storing the multi-node databases, each server 22 may also be referred to herein as a node or a replica of a given multi-node database.

In addition to servers 22, computing facility 20 comprises client computers 32 and a data network 34 that connects all the servers and the client computers. Client computers 32 comprise computing devices that can communicate with the servers via network 34. In operation, a given client computer can convey a request to perform a database read or write operation to a given server 22, and in response to receiving the request, the given server performs the operation and conveys a result of the operation back to the given client computer. While FIG. 1 shows data network 34 configured as a local area network (LAN) any type of wired or wireless network is considered to be within the spirit and scope of the present invention.

Each server 22 comprises a processor 36, a memory 38 and a storage device 40. Each memory 38 stores a coordinator 42, a cache 44, a hit rate 46 and an allocation function 48. In the configuration shown in FIG. 1, each the multi-node databases has a replication factor of three so that replicas of multi-node database 24 are stored on the respective storage devices of servers 22A, 22B and 22C, replicas of multi-node database 26 are stored on the respective storage devices of servers 22A, 22B and 22D, replicas of multi-node database 28 are stored on the respective storage devices of servers 22A, 22C and 22D, and replicas of multi-node database 30 are stored on the respective storage devices of servers 22B, 22C and 22D.

In operation, processor 36 executes coordinator 42 that comprises a software application configured to receive read requests from clients 32, and to use request allocation fractions 50 (also referred to herein simply as fractions, percentages or probabilities) in allocation function 48 to decide whether to process the read requests locally and/or to forward the read requests to one or more other servers 22. In embodiments of the present invention a given processor 36 in a given node 22 can process a read request locally by retrieving data from a given storage device 40 in the given node. For example, processor 36A can locally process a read request for database 24 by retrieving data from replica 24A on storage device 40A.

In one embodiment, server 22A receives, for multi-node database 24, a read request having a consistency level of one, and the coordinator executing on server 22A can use the fractions in the allocation function to determine whether to read the requested data locally or to forward the read request to servers 22B or 22C. In another embodiment, server 22A receives, for multi-node database 24, a read request having a consistency level of two, and the coordinator executing on server 22A can use the fractions in the allocation function to determine whether to read the requested data locally and from server 22B, locally and from server 22C or from servers 22B and 22C. Assigning read requests to servers 22 based on the fractions in allocation function 48 is described in the description referencing FIGS. 2-4 hereinbelow.

In operation, allocation function 48 typically comprises respective sets of fractions 50 for each replica of a multi-node database stored on each given server 22. Therefore, in the example shown in FIG. 1, allocation function 48A stores respective sets of fractions 50A for databases 24, 26 and 28, allocation function 48B stores respective sets of fractions 50B for databases 24, 26 and 30, allocation function 48C stores respective sets of fractions 50C for databases 24, 28 and 30, and allocation function 48D stores respective sets of fractions 50D for databases 26, 28 and 30.

In embodiments of the present invention, each given set fractions 50 for a given multi-node database comprises respective fractions for each replica of the given database. In the example shown in FIG. 1, the replication factor is three and each server 22 stores replicas of three multi-node databases. Therefore, each server 22 stores three sets of three fractions 50.

Examples of memories 38 include, but are not limited to, dynamic random-access memories and non-volatile random-access memories. Examples of storage devices 40 comprise non-volatile storage devices such as hard disk drives and solid-state disk drives.

Processors 36 comprise general-purpose central processing units (CPU) or special-purpose embedded processors, which are programmed in software or firmware to carry out the functions described herein. This software may be downloaded to servers 22 in electronic form, over a network, for example. Additionally or alternatively, the software may be stored on tangible, non-transitory computer-readable media, such as optical, magnetic, or electronic memory media. Further additionally or alternatively, at least some of the functions of processors 36 may be carried out by hard-wired or programmable digital logic circuits.

Multi-Node Database Read Request Allocation

Figure 2:
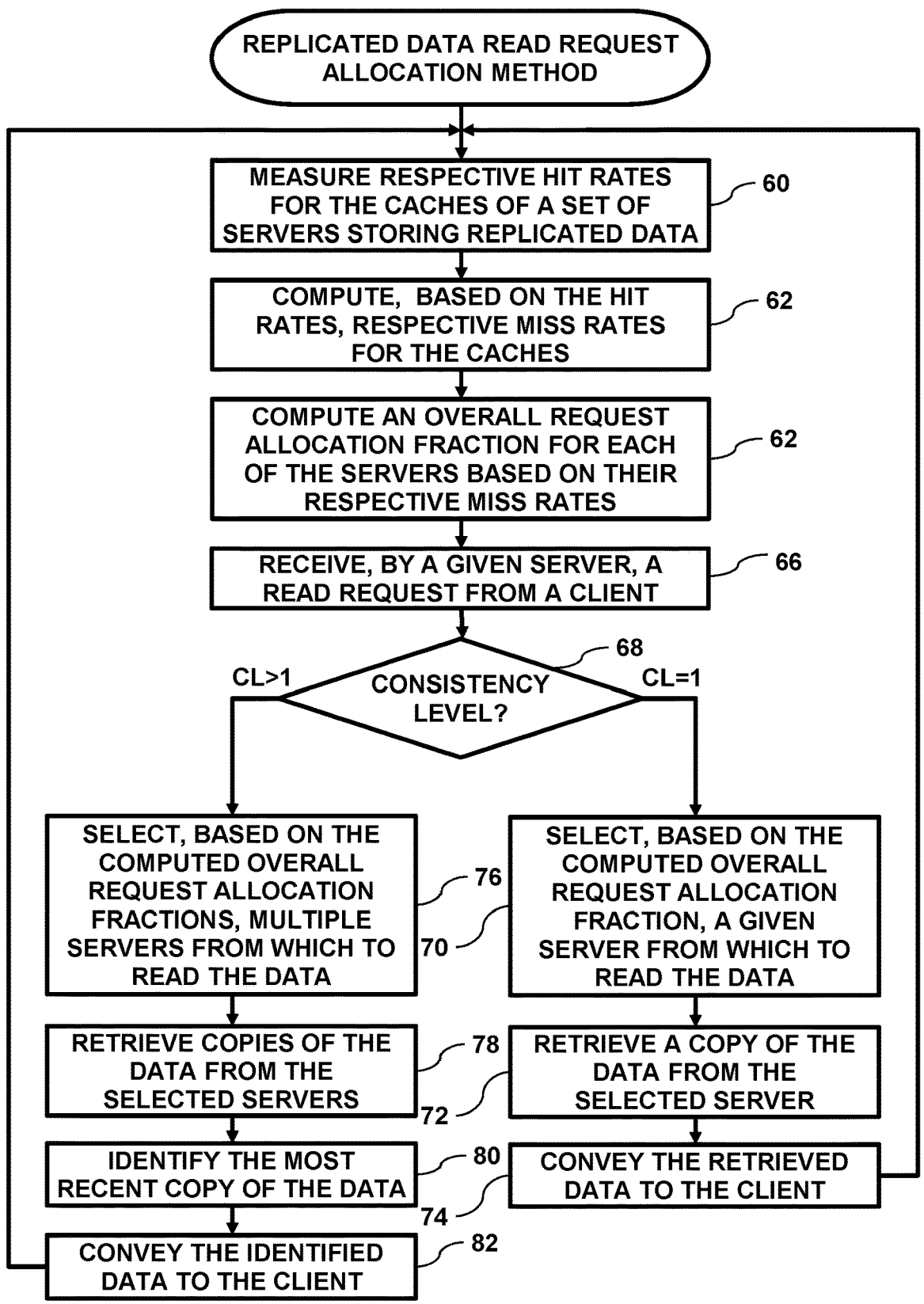
FIG. 2 is a flow diagram that schematically illustrates a method of allocating read requests to one or more nodes of a given multi-node database, in accordance with an embodiment of the present invention.

FIG. 2 is a flow diagram that schematically illustrates a method for using the fractions in function 48 to allocate read requests for a given multi-node database stored on servers 22, in accordance with an embodiment of the present invention. For purposes of simplicity, in the description referencing FIGS. 2-4, coordinator 42A executing on server 22A receives and processes read requests for multi-node database 24. While the example in FIG. 2 describes using allocation function 48 to allocate read requests for multi-node database 24, using the allocation function to allocate read requests to any corpus of data replicated on servers 22 is considered to be within the spirit and scope of the present invention.

In step 60, processor 36A measures the cache hit rates for servers 22. In one embodiment, processor 36A can retrieve hit rate 46A locally from memory 38A. In another embodiment, as servers 22B-22D respond to read or write requests from processor 36A, the each response from a given server 22 may include the current cache hit rate for the given server. Allocating read requests based on the cache hit rates is described in the following paragraphs.

In step 62, processor 36A computes miss rates for the caches in servers 22 based on their respective hit rates. The miss rate for a given server 22 is $(1-H_i)$, where $H_i$ is the hit rate for the given server. In embodiments described herein, server "1" (i.e., i=1) is server 22A, server "2" (i.e., i=2) is server 22B and server "3" (i.e., i=3) is server 22C.

In step 64, processor 36A computes fractions 50A for allocation function 48A based on the miss rates for the caches. In some embodiments, processor 36A computes fractions 50A using the formula $$P_i = \frac{R_i}{\sum_{j=1}^{N} R_j} \quad (1)$$

where $P_i$ is the fraction for server i, N is the replication rate for database 24, and $R_i$ is the reciprocal miss rate, which can be computed as $R_i=1/(1-H_i)$. By computing $P_i$, processor 36A can adjust allocation function 48A responsively to the cache miss rates of servers 22.

While embodiments described herein use Formula (1) to compute fractions 50A, any formula that computes the fractions based on cache hit rates 46 is considered to be within the spirit and scope of the present invention. For example, if a given processor 36 can compute probabilities based on the number of hits and misses in each of the caches, an amount of time typically required to process read requests for data stored in a given cache 44 (i.e., a cache hit), an amount of time typically requested to process a read request for data not stored in a given cache 44 (i.e., a cache miss where data needs to be retrieved from a given storage device 40.

By using Formula (1), processor 36A can assign fractions 50A that are inversely proportional to their respective cache miss rates. In one example, if hit rates 46A and 46B are both 85% and server 22C is rebooted (therefore hit rate 46C is 0%), then the miss rates are $(1-H_1)=15\%$, $(1-H_2)=15\%$, $(1-H_3)=100\%$, and Formula (1) computes $P_1=46.5\%$, $P_2=46.5\%$, and $P_3=7\%$.

In operation, computing a lower $P_i$ for any given server 22 a having higher cache miss rate minimizes the performance impact when rebooting a given server 22.

In a second example, if hit rate 46A is 80%, hit rate 46B is 60% and hit rate 46C in 20%, then the miss rates are $(1-H_1)=20\%$, $(1-H_2)=40\%$, $(1-H_3)=80\%$, and Formula (1) computes $$P_1=57.1\%, P_2=28.6\%, P_3=14.3\%.$$

In this example, the cache miss rate of cache 44C is double the cache miss rate of cache 44B, and the cache miss rate of cache 44B is double the cache miss rate of cache 44A. As shown by Formula (1), the fraction computed for server 22C is half of the fraction computed for server 22B, and the fraction computed for server 22B is half of the fraction computed for server 22A. In other words, embodiments of the present invention can assign, to servers 22, fractions 50 that are inversely proportional to their respective cache miss rates, thereby assigning lower fractions 50 to the servers having higher cache miss rates, which can lessen the impact of a server restart.

The fractions computed by Formula (1) are overall fractions of the read requests that will be processed by servers 22A-22C that store database 24. However, since each of the three servers storing replicas of database 24 will receive approximately one-third of the read requests for database 24, the fraction of requests that each given server 22 receives and processes locally may be different from its respective fraction 50. These fractions are described in the description referencing FIGS. 3 and 4 hereinbelow.

In step 66, server 22A receives, from a given client 32, a request to read data from database 24. Upon receiving the request, processor 36A identifies the consistency level for the read request. The consistency level indicates how many copies of the data will be retrieved from the servers in order to process the received read request.

In step 68, if the consistency level for the read request is one, then in step 70, coordinator 42A uses the fractions in allocation function 48 to select one of the servers storing a replica of database 24, and in step 72 retrieves the requested data from the selected server. One example for using the fractions in allocation function 48 to select a server for a given read request having a consistency level of one is described in the description referencing FIG. 3 hereinbelow. Coordinator 42A retrieves the requested data from the selected server in step 72, conveys the retrieved data to the given client in step 74, and the method continues with step 60.

Returning to step 68, if the consistency level for the read request is greater than one, then in step 76, coordinator 42A uses the fractions in allocation function 48 to select the required number of the servers storing respective replicas of database 24, and in step 78 retrieves the requested data from the selected servers. One example for using the fractions in allocation function 48 to select a server for a given read request having a consistency level of greater than one is described in the description referencing FIG. 4 hereinbelow.

In step 80, coordinator 42A retrieves replicas of the requested data from the selected servers in, and identifies the most recent data that was retrieved from the selected servers. In step 82, coordinator 42A conveys the identified to the given client that initiated the request, and the method continues with step 60.

While the steps described in the description referencing FIG. 2 hereinabove describe a given server receiving and allocating read requests, any computer (e.g., a given client 32) receiving request to read data from a given distributed database, identifying one or more servers 22 based on their respective cache miss rates, and forwarding to the one more identified servers is considered to be within the spirit and scope of the present invention.

In multi-node databases, each server 22 comprises a given coordinator 42 that receives and processes database read and write requests received from clients 32. If all the cache hit rates are the same (more or less), then each of the coordinators can process read requests locally. In the example shown in FIG. 1, all the multi-node databases have a replication factor of three. If all hit rates 46 are the same (i.e., within a specified threshold), $P_i$ for each of the servers will be 33.3%. Therefore for the read requests having a consistency level of one, a given coordinator 42 can process all read results locally, and for a given read request having a consistency level of 2, the given coordinator can process one read request locally and send a second read request to any of the other nodes storing another replica of the given multi-node database.

However, if a given server 22 has a cold cache 44, the coordinator on the given server cannot locally process all received read requests, since this would result in the given node processing more than its respective fraction 50 of the request, which can negatively impact overall performance. As described hereinbelow, in addition to computing probabilities $P_i$, embodiments of the present invention provide methods and systems for computing a set of probabilities $Q_{ij}$, which are probabilities that a given coordinator i forwards a given read request to replica j.

Figure 3:
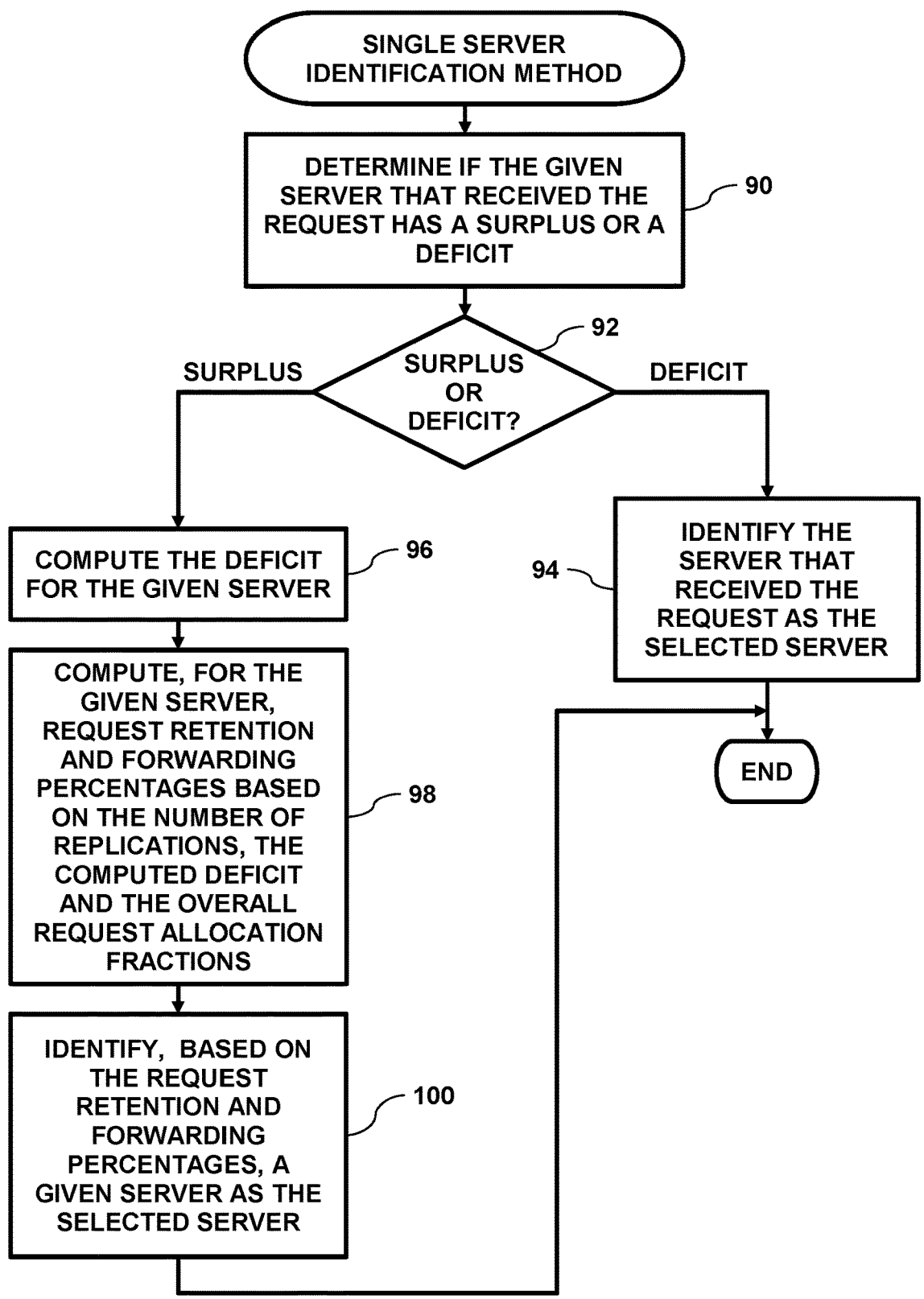
FIG. 3 is a flow diagram that schematically illustrates a method of identifying a given node to allocate a given read request having a consistency level of one, in accordance with an embodiment of the present invention.

FIG. 3 is a flow diagram that schematically illustrates a method for identifying a given server 22 to process a read request having a consistency level of one, in accordance with an embodiment of the present invention. In step 90, a given coordinator 42 executing on given server 22 (i.e., the coordinator that received the request in the description referencing step 66 hereinabove) determines if the given server has a request surplus or a request deficit.

In embodiments of the present invention, if $NP_i<1$ then the fraction of requests that a given coordinator 42 should process locally is $NP_i$ and if $NP_i>=1$ then the given coordinator 42 should locally process all its received read requests. In the example described supra where $P_i$ for a given server 22 is 7%, and the replication factor is three, then the coordinator executing on the given server should locally process 21% of its received requests, and forward the remaining requests to the other servers.

In operation, a given coordinator 42 can minimize network usage by locally processing as many read requests as possible. However, if $NP_i<1$, then the coordinator can only run that number of requests locally (since as we explained above $NP_i$ is the amount of work that this node is supposed to process) and needs to and forward the surplus requests to other nodes. On the other hand, if $NP_i>1$, the coordinator needs to run more requests than it received, so it will run all requests locally and will still have a deficit (other nodes need to send it additional requests).

Returning to the flow diagram, in step 92, the given coordinator determines if the given server (i.e., the server receiving the read request in step 90) has a surplus or a deficit. In embodiments of the present invention, the given server has a surplus $(1-NP_i)$ if $P_i<1/N$, and the given node has a deficit $(NP_i-1)$ if $P_i>=1/N$.

If the given server has a deficit, then in step 94, the given coordinator identifies the given server (i.e., itself) as the server for processing the received request, and the method ends.

If the given server has a surplus, then in step 96, processor 36A uses the formula described supra to compute the surplus for the given server, and in step 98, processor 36A computes, based on the number of replications and the overall request allocation fractions (i.e., $P_i$), request retention and forwarding (also referred to as surplus) percentages for the given server. The retention percentage comprises the percentage of the received requests that the given coordinator will process locally, and the forwarding percentages comprises the percentages of the received requests that the given coordinator will forward to the other servers storing replicas of the multi-node database.

To compute the retention and forwarding percentages, the given coordinator can use the following formula:

$$Q_{ij}=(1-NP_i)(NP_j-1)/D \quad (2)$$

where D indicates a sum of the deficits of all the nodes (which is also, by the way, equal to the sum of surpluses of all the nodes). The following is a description for computing Equation 2:

Equation (2) is executed by coordinator i, receives the list of probabilities $P_j, j=1 \ldots N$ as input, and produces a list of probabilities that coordinator i should forward each request to each other node j.

If $P_i \geq 1/N$, coordinator i processes all requests locally, and does not forward any request to any other node.

However, if $P_i < 1/N$, the coordinator i:
  Processes $NP_i$ of the requests locally.
  Computes the total deficit D as the sum of (only) positive instances of $NP_j-1$.
  For nodes j where $NP_j-1$ is positive (i.e., deficit nodes), the coordinator determines a probability to send to a request to that node using the formula $(1-NP_i)(NP_j-1)/D$.
  Does not send any requests to the other nodes j, since they are "surplus" nodes (i.e., which already handled enough requests, and don't need any more).

Returning to the flow diagram, in step 100, the given coordinator uses the computed retention and forwarding percentages to identify a given server 22 for processing the received request, and the method ends.

For example, using embodiments described in FIG. 3, if the hit rates for the caches in servers 22A-22C are 92%, 88% and 10% respectively, then servers 22A and 22B have respective deficits, server 22C has a surplus, and server 22C will process 15% of its received read requests, will send 71% of its received requests to server 22A, and will send 14% of its received requests to server 22B.

As described supra, each node 22 storing a replica of a multi-node database for a read request having a consistency level of one (i.e., C=1) has either a surplus or a deficit, and can be referred to respectively as a surplus replica or a deficit replica. For nodes storing a replica of a multi-node database for a read request having a consistency level greater than one (i.e., C>1), each of the nodes has a surplus or a combination of a surplus and a deficit. In embodiments described herein, a given node having a surplus and a deficit is referred to as a mixed replica.

If C=1, a given coordinator replica 42 can process all read requests locally by setting its respective P to 1. However, in configurations where C>1, the given coordinator cannot process all the read requests locally since the read request needs to be sent to C different nodes. Therefore, even if the given coordinator processes all read requests locally, then P=1/C. In other words, if C>1, then $P_i \leq 1/C$.

As described supra, when C>1, each node 22 comprises a surplus replica or a mixed replica. Embodiments of the present invention can determine the type of replica by comparing $NP_i$ to $1/C$ as follows:

Surplus replica: In a surplus replica, $NP_i < 1/C$. When C>1, a surplus replica processes a percentage $NP_i (<1/C)$ of the read requests locally, and then has a surplus of requests it still needs to redistribute to other nodes. The amount of this surplus is $1-NP_i$.

Mixed replica: In a mixed replica, $NP_i \geq 1/C$. When C>1, a given mixed replica will always locally process one of the C required requests. In other words the given mixed replica will give itself a fraction of 1/C. However, since the given mixed replica still has a deficit, it needs to accept from additional read requests from other nodes in order to reach the desired load of $NP_i$. The amount of this deficit is therefore $NP_i-1/C$. In addition to having a deficit, each mixed node also has a surplus. The reason for this is that since a given mixed replica can only process 1/C of the requests locally, it needs to allocate the remaining requests (i.e., $1-1/C$ in this case) to the other nodes.

The allocation of read requests to mixed and surplus replicas is summarized in the following table:

|  | Keep for node i | Surplus $S_i$ | Deficit $D_i$ |
| --- | --- | --- | --- |
| Surplus node $NP_i < 1/C$ | $NP_i$ | $1 - NP_i$ | 0 |
| Mixed node $NP_i \geq 1/C$ | $1/C$ | $1 - 1/C$ | $NP_i - 1/C$ |

Figure 4:
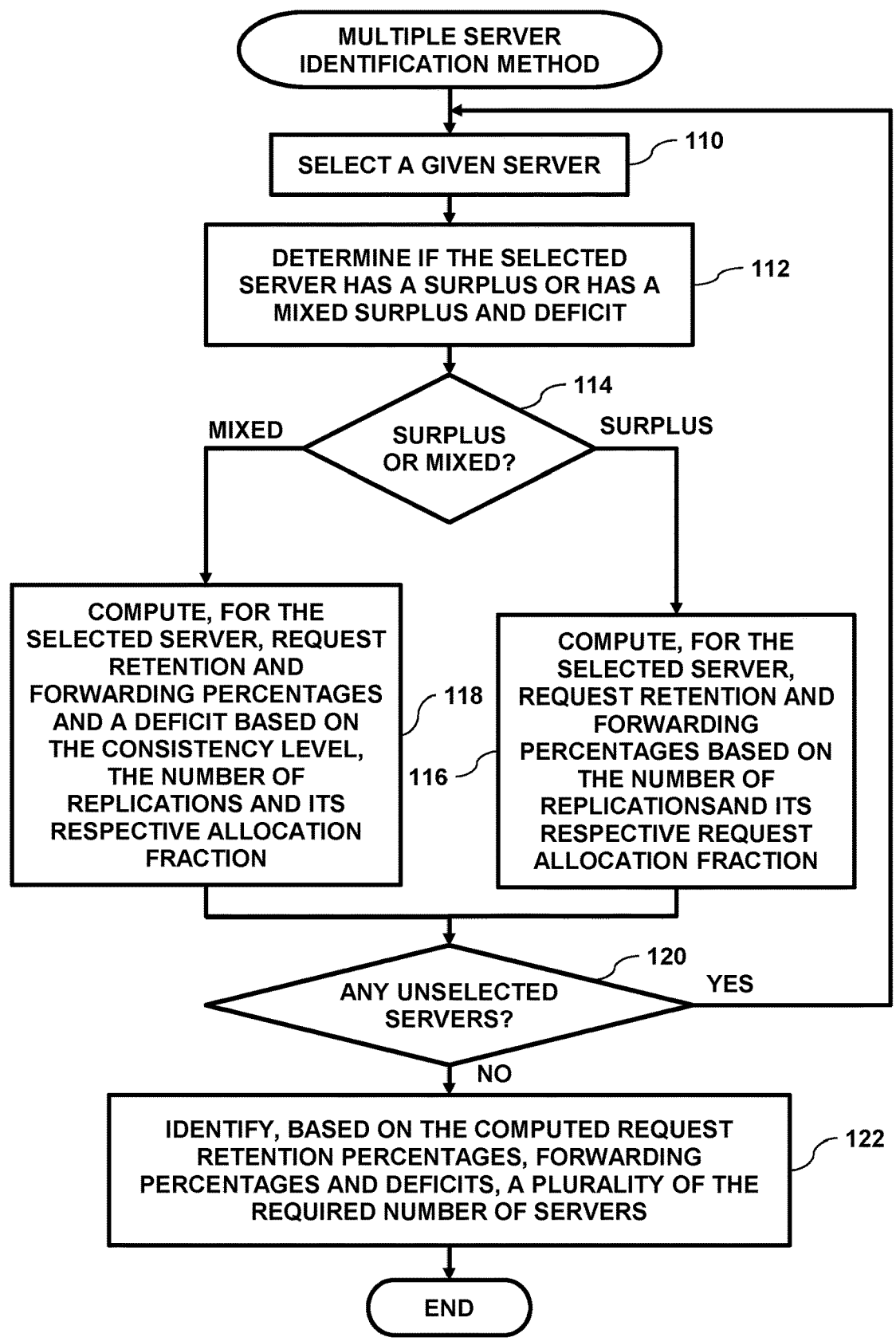
FIG. 4 is a flow diagram that schematically illustrates a method of identifying multiple nodes to allocate a given read request having a consistency level greater than one, in accordance with an embodiment of the present invention.

FIG. 4 is a flow diagram that schematically illustrates a method of identifying multiple nodes for processing a read request having a consistency level of greater than one, in accordance with an embodiment of the present invention. As described supra, the read request description referencing FIGS. 2-4, coordinator 42A receives a request to read data from database 24, which is stored on servers 22A, 22B and 22C.

In step 110, coordinator 42A selects a given server 22 (i.e., 22A, 22B or 22C), and in step 112, the coordinator determines if the selected server is a surplus or a mixed replica. As described supra, $NP_i < 1/C$ indicates a surplus replica, and $NP_i \geq 1/C$ indicates a mixed replica.

In step 114, if the given server comprises a surplus replica, then in step 116, the given coordinator computes, based on number of replications and the request allocation fraction for the given server, request and forwarding percentages for the given server. If, in step 114, the given server comprises a mixed replica, then in step 118, the given coordinator computes, based on the consistency level, the number of replications and the request allocation fraction for the given server, request and forwarding percentages for the given server. Details for computing the request and forwarding percentages for a given server 22 is described in Appendix 1, hereinbelow.

In step 120, if there are any unselected servers, then the method continues with step 110 where the given coordinator selects a previously unselected server 22. However, if there are no unselected servers, then in step 122, the given coordinator identifies, based on the computed deficit(s), retention percentages and forwarding percentages, a plurality of C servers for processing the received request, and the method ends.

APPENDIX 1: COMPUTING REQUEST AND RETENTION PERCENTAGES FOR C>1

When allocating read requests having a consistency level greater than one, the total amount of surplus and total amount of deficit to be redistributed is equal. As the following equations show, the total surplus equals the total deficit:

$$\text{surplus} - \text{deficit} =$$

$$\sum_{i \in \text{surplus nodes}} (1 - NP_i) + \sum_{i \in \text{mixed nodes}} (1 - 1/C) - \sum_{i \in \text{mixed nodes}} (NP_i - 1/C) =$$

$$\Sigma_{i \in \text{surplus nodes}} (1 - NP_i) + \Sigma_{i \in \text{mixed nodes}} (1 - NP_i) =$$

$$\Sigma_i (1 - NP_i) = N - N\Sigma_i P_i = N - N = 0$$

When C>1, it is considerably harder to redistribute the surplus probability among the "i"s with deficit, because there is the following additional restriction: A mixed replica is not allowed to contribute its own surplus to fill its own deficit, because it already runs the request locally every time. Therefore, in order to fulfill the consistency-level C requirement, since it is not allowed to perform the request locally a second time (i.e., on the same node), a mixed replica node needs to pick a different node to which to send the request.

The following two examples can help clarify the difficulties that are faced, and then can enable presentation of an algorithm. In the first example, consider the example where there are three replicas (N=3) with equal hit rates and therefore equal $P_i$, and we want C=2:

|  | Node 0 | Node 1 | Node 2 |
| --- | --- | --- | --- |
| Surplus | 0.5 | 0.5 | 0.5 |
| Deficit | 0.5 | 0.5 | 0.5 |

(Note that for purposes of simplicity, the "keep in i" row is omitted from the table).

In embodiments of the present invention, a given node cannot use its surplus to close its own deficit or a part of it. So the trivial plans "every node closes its own deficit" (in this case, the numbers match) or "every node contributes a third of its surplus to cover a third of every node's deficit" are not possible. Instead, the solution in this example is that every node contributes a half of its surplus to cover half of the deficit of each of the other two nodes. Specifically, node 0 sends 0.25 from its surplus requests to node 1 and 0.25 to node 2. Node 1 sends 0.25 to node 0 and 0.25 to node 2, and node 2 sends 0.25 to node 0 and 0.25 to node 1. Upon completion, each given node has sent its entire surplus, and each given node has covered its entire deficit.

In this example, this solution where each replica sends half of its deficit to each of the other two replicas is just one of very large number number of solutions. Another possible solution is that node 0 sends 0.5 (i.e., its entire surplus) to node 1, node 1 sends 0.5 to 2, and node 2 sends 0.5 to 3. While theoretically that is also a good solution, it suffers from a serious stability problem.

The stability problem is that this solution can change drastically if the input conditions change slightly. Remember that each of the three replicas is a separate server 22, which needs to decide on its own which node to send how much of its surplus requests. If the different replicas do not agree on the order of the replicas and their numbering, this alternative solution might have replica 0 send all its surplus to replica 1, but replica 2 to will also send all its surplus to replica 1, resulting in skewed load, where replica 1 gets forwarded too many requests, and the other replicas get too few requests. This is why the symmetric division presented above (a node sends equal surplus to both other nodes) is greatly preferred.

While the first example resulted in a nice symmetric formula for what each node i needs to send to each node j, in the general case such a formula is unfortunately not possible, and a more elaborate algorithm may be needed. In a second numerical example, consider N=4, C=2, where all four nodes are mixed, but this time there are different deficits in the nodes. Note that all surpluses are equal (i.e., they are all 1−1/C)—this will play an important part in the algorithm below:

| Surplus | 0.5 | 0.5 | 0.5 | 0.5 |
| --- | --- | --- | --- | --- |
| Deficit | 0.2 | 0.3 | 0.6 | 0.9 |

Also, note the mixed nodes are ordered by increasing deficit—this will also be helpful to the algorithm.

Looking at the above table one can make the following observation: All deficits and surpluses are higher than 0.2, which is the minimal deficit in the table. This observation is the key to the algorithm presented here. It allows asking all four mixed replicas to conveyed 0.2 from their surplus to other nodes, and the conveyed surplus can be divided equally between other nodes (which, as explained above, can improve the stability of the algorithm). Each of the replicas can then convey a third of 0.2 from its surplus requests to each of the three other nodes. After this redistribution, the surpluses and deficits are as follows:

| Surplus | 0.3 | 0.3 | 0.3 | 0.3 |
| --- | --- | --- | --- | --- |
| Deficit | 0.0 | 0.1 | 0.4 | 0.7 |

At this point, the first node no longer has any deficit to redistribute. It is therefore no longer a mixed replica, as it has been "converted" it to a deficit replica. In essence, the purpose of the following algorithm presented is to convert (by redistribution of surplus to the deficit of other replicas) all mixed replicas into either deficit or surplus replicas, so there will be the same situation of the previous section (separate surplus and deficit replicas), and can use its simple surplus redistribution algorithm.

Continuing the above example, one three mixed replicas remain:

| Surplus | 0.3 | 0.3 | 0.3 |
| --- | --- | --- |
| Deficit | 0.1 | 0.4 | 0.7 |

Now the minimal deficit is 0.1, and the same redistribution process for 0.1 of the surplus can be performed, but this time between only three nodes. This leaves:

| Surplus | 0.2 | 0.2 | 0.2 |
| --- | --- | --- |
| Deficit | 0 | 0.3 | 0.6 |

Again, one node remains with zero deficit, has essentially been converted to a surplus node, and two mixed nodes remain:

| Surplus | 0.2 | 0.2 |
| --- | --- |
| Deficit | 0.3 | 0.6 |

At this point, the minimal deficit in the table (i.e., 0.3), is higher than the identical surplus in each node (i.e., 0.2). Therefore, the full amount of the surplus can be redistributed. In this case each node sends 0.2 of surplus to the other node. This results in:

| Surplus | 0 | 0 |
|---|---|---|
| Deficit | 0.3 | 0.6 |

So both remaining mixed replicas have been converted to deficit replicas, and the algorithm has completed: All mixed replicas have been converted to either surplus replicas (the first two steps we showed, for replicas with deficit below the surplus) or to deficit replicas (the last step shown above, i.e., for the replicas with deficit higher than the surplus)—and from here the surplus redistribution algorithm from the previous section can proceed.

There is one problem with the last stage of the algorithm that was just presented. In that last stage, some of the mixed replicas (specifically those whose deficit is higher than the surplus) were converted into deficit replicas. However, this can only be done if there are two or more such replicas. If there is only one such replica, then there will only be one remaining mixed node, which is not allowed to send its own surplus to fill its own deficit.

How can this problem happen, what does it really mean, and how can it be fixed? Examine the following example: Take N=3, C=2 with desired probabilities $P_0$=0.2, $P_1$=0.3, $P_3$=0.5, which results in the following surplus and deficits:

| Surplus | 0.5 | 0.5 | 0.5 |
|---|---|---|---|
| Deficit | 0.1 | 0.4 | 1.0 |

The previously presented algorithm starts by each of the three replicas redistributing 0.1 from its surplus between the two other nodes. The first node becomes a surplus replica with surplus 0.4, and the remaining two mixed replicas now have:

| Surplus | 0.4 | 0.4 |
|---|---|---|
| Deficit | 0.3 | 0.9 |

At this point, 0.3 of the surplus can be distributed between these two replicas, the first one becomes a surplus replica (with surplus 0.1), and only one mixed replica remains:

| Surplus | 0.1 |
|---|---|
| Deficit | 0.6 |

There is a problem here in that the 0.1 surplus remaining on this mixed replica cannot be "resolved", because it is not allowed to send this surplus to itself, as described supra. This problem results from the first step of the algorithm, when 0.1 of the surplus was exchanged equally between all three nodes, but it turns out that the only solution to the surplus redistribution in this case is that nodes 0 and 1 must send their entire surplus (totaling 1.0) to node 2 to cover its deficit of 1.0. Node 0 and 1 cannot afford to give some of their surplus to each other instead of node 2m since doing so will result in an extra deficit (and surplus) in node 2 which cannot be covered, as described above.

To solve this problem, instead of redesigning the previous stages of the algorithm to solve this fairly uncommon case, a stage of "fixing" is added to the error that was made in the previous stage:

At this point of the example, the following has been calculated:

Who sent what to whom:

|  | To 0 | To 1 | To 2 |
|---|---|---|---|
| From 0 |  | 0.5 | 0.05 (in first stage) | 0.05 (in first stage) |
| From 1 | 0.05 (in the first stage) | 0.5 | 0.05 (in first stage) + 0.3 (in second stage) |
| From 2 | 0.05 (in first stage) | 0.05 (in first stage) + 0.3 (in second stage) | 0.5 |

Remaining surplus and deficit:

|  | Replica 0 | Replica 1 | Replica 2 |
|---|---|---|---|
| Surplus | 0.4 | 0.1 | 0.1 |
| Deficit | 0 | 0 | 0.6 |

While it may be desirable to redistribute 0.1 of replica 2's surplus, this cannot be done since 0 and 1 do not have any deficit. The goal at this stage is to change the probability sending matrix in such a way that a total of 0.1 of the probability sent to replicas 0 and 1 is reduced and instead the 0.1 is sent to 2 (covering 0.1 from its deficit), while at the same time, 2 sends exactly the same probabilities back to replicas 0 and 1, so they remain with deficit 0 status, and replica 2 loses 0.1 of its surplus (i.e., to do that). In this way, replica 2 with surplus/deficit 0.1/0.6 is converted a deficit-only replica with deficit 0.5.

The following is a description for fixing the probability matrix as described above. The relevant parts of the matrix to fix are the first two rows (i.e., from replicas 0 or 1) and their first two columns (to 0 and 1). The diagonal cannot be changed, since this is what each node keeps locally (this was chosen to reduce network traffic and this should not be changed). So the remaining relevant cells are:

|  | To 0 | To 1 |
|---|---|---|
| From 0 |  | 0.05 |
| From 1 | 0.05 |  |

To "redirect" 0.1 of probability, both cells mused be zeroed out, and then compensated as follows:

Nodes 0 and 1 each send this 0.05 to node 2—thereby reducing its deficit by a total of 0.1.

Node 2 sends to nodes 0 and 1, which previously were the target of 0.05 from each other, this 0.05, to avoid nodes 0 and 1 gaining deficits. By doing this, node 2 loses 0.1 of its surplus, which was its entire surplus, and finally becomes a deficit node.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
replicating a corpus of data on a group of a plurality of servers;
receiving requests from clients to access the corpus of data that is replicated on the group of servers;
distributing the requests among the servers for execution in accordance with an allocation function, which indicates respective fractions of the requests that are to be assigned to each of the servers for execution, such that different servers in the group receive requests at different rates;
measuring respective cache miss rates incurred by the servers in responding to the requests that are distributed to each of the servers; and
adjusting the fractions in the allocation function and the corresponding rates at which the servers receive requests, responsively to the cache miss rates.

2. The method according to claim 1, wherein measuring the respective cache miss rates comprises measuring respective first and second cache miss rates of first and second servers in the group and detecting that the first cache miss rate is higher than the second cache miss rate, and wherein adjusting the allocation function comprises, responsively to detecting that the first cache miss rate is higher than the second cache miss rate, decreasing a first fraction of the requests that is assigned to the first server while increasing a second fraction of the requests that is assigned to the second server.

3. The method according to claim 1, wherein adjusting the allocation function comprises assigning each of the fractions a value inversely proportional to its respective cache miss rate.

4. The method according to claim 1, wherein the corpus of data comprises a multi-node database, and wherein the servers comprise nodes of the multi-node database.

5. The method according to claim 4, wherein the steps of receiving the requests, distributing the requests, measuring the respective miss rates, and adjusting the allocation function are performed by each of the nodes.

6. The method according to claim 5, wherein the multi-node database has a specific number of replications, wherein each of the nodes receives respective disjoint subsets of the requests, and wherein distributing the requests to the nodes comprises processing locally, by the given node a number of its received subset of requests in accordance with its respective fraction in the allocation function and the number of replications, and forwarding its other received requests to the other nodes, thereby minimizing, on the network, data traffic for processing the received requests.

7. The method according to claim 6, wherein the nodes comprise respective storage devices, and wherein processing, by a given node, a given request locally comprises retrieving data from its respective storage device.

8. The method according to claim 1, wherein adjusting the allocation function equalizes the cache miss rates when processing additional requests to access the corpus of data.

9. A computer, comprising:
a memory configured to store an allocation function; and
a processor configured:
to replicate a corpus of data on a group of a plurality of servers;
to receive requests from clients to access the corpus of data that is replicated on the group of servers,
to distribute the requests among the servers for execution in accordance with the allocation function, which indicates respective fractions of the requests that are to be assigned to each of the servers for execution, such that different servers in the group receive requests at different rates,
to measure respective cache miss rates incurred by the servers in responding to the requests that are distributed to each of the servers, and
to adjust the fractions in the allocation function and the corresponding rates at which the servers receive requests, responsively to the cache miss rates.

10. The computer according to claim 9, wherein the processor is configured to measure the respective cache miss rates by measuring respective first and second cache miss rates of first and second servers in the group and detecting that the first cache miss rate is higher than the second cache miss rate, and wherein the processor is configured to adjust the allocation function by, responsively to detecting that the first cache miss rate is higher than the second cache miss rate, decreasing a first fraction of the requests that is assigned to the first server while increasing a second fraction of the requests that is assigned to the second server.

11. The computer according to claim 9, wherein the processor is configured to adjust the allocation function by assigning each of the fractions a value inversely proportional to its respective cache miss rate.

12. The computer according to claim 9, wherein the processor comprises a first processor and the memory comprises a second processor, wherein the corpus of data comprises a multi-node database, and wherein the servers comprise nodes of the multi-node database, each of the nodes comprising a second processor, a second memory, and one or storage devices.

13. The computer according to claim 12, wherein the steps of receiving the requests, distributing the requests, measuring the respective miss rates, and adjusting the allocation function are performed by each of the nodes.

14. The computer according to claim 13, wherein the multi-node database has a specific number of replications, wherein each of the nodes is configured to receive respective disjoint subsets of the requests, and wherein a given node is configured to distribute the requests to the nodes by processing locally, a number of its received subset of requests in accordance with its respective fraction in the allocation function and the number of replications, and forwarding its other received requests to the other nodes, thereby minimizing, on the network, data traffic for processing the received requests.

15. The computer according to claim 14, wherein processing, by the given node, a given request locally comprises retrieving data from its respective storage device.

16. The computer according to claim 9, wherein adjusting the allocation function equalizes the cache miss rates when processing additional requests to access the corpus of data.

17. A computer software product, the product comprising a non-transitory computer-readable medium, in which program instructions are stored, which instructions, when read by a computer, cause the computer:
to replicate a corpus of data on a group of a plurality of servers;
to receive requests from clients to access the corpus of data that is replicated on the group of servers;
to distribute the requests among the servers for execution at different rates in accordance with an allocation function, which indicates respective fractions of the requests that are to be assigned to each of the servers for execution, such that different servers in the group receive requests at different rates;

to measure respective cache miss rates incurred by the servers in responding to the requests that are distributed to each of the servers; and to adjust the fractions in the allocation function and the corresponding rates at which the servers receive requests, responsively to the cache miss rates.

* * * * *